United States Patent [19]

McVay et al.

[11] Patent Number: 4,666,982
[45] Date of Patent: May 19, 1987

[54] CLEAR AQUEOUS INTERIOR ENAMELS

[75] Inventors: Robert L. McVay; Cathy V. Emo; Virginia P. Rush, all of Cincinnati, Ohio

[73] Assignee: BASF-Inmont Division, Clifton, N.J.

[21] Appl. No.: 848,595

[22] Filed: Apr. 7, 1986

Related U.S. Application Data

[63] Continuation-in-part of Ser. No. 750,961, Jul. 2, 1985, abandoned.

[51] Int. Cl.[4] ............................................. C08F 8/00
[52] U.S. Cl. .................................................... 525/109
[58] Field of Search ......................... 524/432; 525/109

[56] References Cited

U.S. PATENT DOCUMENTS

| | | | |
|---|---|---|---|
| 3,175,991 | 3/1965 | Levine et al. | 524/432 |
| 3,450,656 | 6/1969 | Pierce et al. | 524/432 |
| 4,165,308 | 8/1979 | Serlin | 524/432 |
| 4,243,416 | 1/1981 | Grourke et al. | 524/432 |
| 4,249,953 | 2/1981 | Keifer et al. | 524/432 |
| 4,267,089 | 5/1981 | Brown | 524/432 |

FOREIGN PATENT DOCUMENTS

| | | | |
|---|---|---|---|
| 0249759 | 9/1962 | Australia | 524/558 |
| 622140 | 6/1961 | Canada | 524/432 |
| 0071324 | 2/1970 | German Democratic Rep. | 524/432 |
| 0069638 | 5/1980 | Japan | 524/432 |
| 0057758 | 4/1982 | Japan | 524/432 |
| 0189267 | 4/1983 | Japan | 524/432 |

*Primary Examiner*—Joseph L. Schofer
*Assistant Examiner*—J. M. Reddick
*Attorney, Agent, or Firm*—M. R. Chipaloski

[57] ABSTRACT

Aqueous "C" enamels which bake to yield clear, rather than opaque films, and which contain very high carboxylic acid levels in the enamel may be prepared by reacting a zinc oxide containing predispersion at elevated temperatures with a highly carboxylate enamel.

2 Claims, No Drawings

CLEAR AQUEOUS INTERIOR ENAMELS

This is a continuation-in-part application of Ser. No. 750,961 filed 7/2/85, now abandoned.

BACKGROUND OF THE INVENTION

In the past Interior "C" Enamels which yield opaque films, U.S. Pat. No. 3,450,656, Col-1, Line 33-38, have been used to coat the interior of vegetable cans which contain wet foodstuffs. These "C" enamels, single package or two package, bake to give an opaque or milky film.

The zinc oxide pigment plays a two-fold role in protecting the appearance of the container and the packed food. Sulfur compounds in food may react with the ferric ions in the container's surface producing black iron sulfide. In the presence of zinc oxide, the sulfur compounds react preferentially with the zinc oxide forming white, zinc sulfide. Also, the opaque nature of the film produced by dispersing zinc oxide pigment in the varnish or enamel provides a visual carrier or mask to any unsightly discoloration of the metal surface, if it should occur.

The milky appearance is not always desireable to canners but is necessary in order to achieve good sulfide stain resistance. Many canners like the traditional clear gold appearance seen in many food cans, but they must accept the opaque look of a conventional "C" enamel for performance because the alternative was not available.

Prior to this invention the zinc oxide was incorporated simply by stirring or milling at room temperature a zinc oxide paste predisperson into the enamel or varnish of the coating.

This is a relatively inefficient manner for incorporating zinc oxide and required zinc oxide levels of 1% or more, U.S. Pat. No. 3,450,656, for acceptable sulfide stain resistance.

The metals used to fabricate cans for food packaging have changed over the years. Previously, cans had tin coating weights of 0.25 pounds of tin to 1.00 pounds of tin per 435.4 square feet of metal. Today, tin coating weights have been reduced to about 0.20 pounds of tin per 435.4 square feet of metal. This low tin weight steel is called L.T.S., or lightly tinned steel. This point is critical to both the packer and the coating supplier since it is easier to achieve good sulfide stain resistance on high tin weight steel than low tin weight steel. The thicker tin coating over the iron acts as a secondary or backup coating to protect the iron from the formation of iron sulfide. The current invention provides even greater stain resistance than the conventional "C" enamels since we are coating L.T.S. with a transparent, gold film.

In recent years, water-based coatings have found increasing use as interior coatings for food cans. The reason is changing laws and restrictions on solvent emissions which precludes the use of conventional solvent based coatings.

Some of the problems with most water based sanitary enamels are poor sulfide stain resistance and marginal adhesion on low tin weight cans, after steam processing. Steam processing is the process where the food which is being canned is heated 250° F. in the can in order to sterilize it.

In an effort to cut costs, canners are not only using low tin weight metal, but are not subjecting the metal to the washing treatments necessary to remove surface contamination which causes adhesion failures.

SUMMARY OF THE INVENTION

We have found that in order to guarantee good adhesion to slightly dirty or oily low tin weight metal, an acid number of 200 or greater (in the base resin) is necessary. This means that based on the acrylic portion of the varnish or enamel that our coating contains at least 30% carboxyl acid by weight on solids. By on solids, we mean that the solvents are subtracted out and then the precentages are calculated.

This is unique for "C" enamels because acid numbers of no greater than 15 have been necessary in the past U.S. Pat. No. 3,450,056 Col. 3 Lines 63-70, with most examples having acid numbers less than 0.5 U.S., Pat No. 3,4540,656, claims 6, 7.

We have also found that in order to guarantee good stain resistance with water based "C" enamels on low tin weight metal we must incorporate the zinc oxide more efficiently than in the past. To do this, we have found that if we react the zinc oxide with the amine neutralized carboxyls of the acrylic portion of the polymer at elevated temperatures the zinc oxide becomes solubilized. Solubilizing the zinc oxide yields more surface area of zinc oxide available to react with sulfide and therefore we need less zinc oxide than in conventional "C" enamels. Our zinc oxide levels are less than 1% by weight.

It is the object of this invention to describe a procedure for producing clear "C" enamels by reacting a zinc oxide predisperison with a water based high carboxyl containing acrylic-epoxy-phenolic polymer system at elevated temperatures.

It is the object of this invention to describe a water based clear "C" enamel which has excellent adhesion to low tin weight metal used to make cans today.

It is the object of this invention to describe a clear "C" enamel which has less than 1% zinc oxide and has resistance properties equivalent to conventional "C" enamels with 1% or more zinc oxide.

It is the object of this invention to describe a clear water based "C" enamel which contains very high carboxyl acid levels on acrylic solids in the enamel.

In particular, this invention relates to water based single package "C" enamels which when baked yield clear rather than opaque films. These coatings which contain less zinc oxide than conventional "C" enamels have better sulfide stain resistance (than conventional opaque "C" enamels) on low tin weight cans. These clear "C" enamels also contain much more carboxylic acid, a higher acid number, on solids in the let down enamel than conventional "C" enamels.

The clear nature (of the film) of the single package "C" enamel here is due to the heat treatment of the zinc paste in the presence of a highly carboxylated acrylic resin system.

The "C" enamel composition of this invention is produced in a two step procedure. The first step is the formation of a stable zinc paste. The second step is the blending of the stabilized zinc paste with a high acid number water reducible resin system under controlled temperature conditions. The base resin and zinc paste are combined at elevated temperatures, 60° C., under vigorous agitation. The blended resin system is then neutralized with an amine, such as ammonia or dimethylaminoethanol or any other organic amine, to a predetermined degree, and finally reduced with water to a solids level and viscosity required for applicaiton.

DETAILED DESCRIPTION OF THE INVENTION

The clear single package "C" enamel of the present invention is produced by reacting a zinc oxide paste predisperison with the enamel or varnish portion of the coating at elevated temperatures.

According to this invention, a zinc oxide paste is prepared by dispersing the pigment in a carboxyl functional, partially neutralized aqueous solution of an acrylic resin to a grind fineness of 5-15 microns as measured on a Hegman gauge. Any of the techniques known to the art, such as Netzch, sand or ball milling, as well as Cowles dispersing may be used to prepare the grind. We prefer using a two stage procedure. In the first stage, a predispersion of the zinc oxide is made by slowly mixing the pigment with an aqueous solution of carboxyl funcitonal acrylic resin. The second stage is the addition of the predispersion to a ball mill where it is ground to the desired fineness.

The acrylic resin used in the paste grind should be of such viscosity as to allow proper grinding, and may be prepared by any of the techniques known to the art. The acrylic resin used in the paste has a preferred acid number of between 100 and 175 mg KOH/g. Monomer compositions preferred are those which provide the proper degree of hardness, flexibility, chemical resistance and rheological characteristics ot the finished enamel. Characteristics of a typical acrylic resin, suitable for use in the preparation of a zinc oxide paste are described in Example 1. The acrylic resin may be prepared by conventional solution polymerization. Preferred monomers are styrene and substituted styrenes, acrylic and methacrylic esters, acrylic and methacrylic carboxyl and hydroxyl functional monomers, acrylamide and substituted acrylamides, and acrylonitrile.

The base resin used in the production of the finished "C" enamel may be either a carboxyl containing acrylic, or an acrylic/epoxy copolymer or co-resin. The base resin, which should be water dispersible, may be prepared by any of the methods taught in any of U.S. Pat. Nos. 4,482,673; 4,247,4329; and 4,458,040. Preferred acid number range for the acrylic portion of the base co-resin is between about 200 and about 250. Preferred monomer composition are similar to those described in the above mentioned patents.

Coatings prepared using this procedure may be modified by the addition for thermosetting phenolic resin or an amino resin. If the modifying resin is water soluble or dispersible it may be added after the paste and base resin have been blended and reduced with water. If the phenolic resins or amino formaldehyde resins are water insoluble, they may be added to the paste and base resin blend prior to the addition of water. The surfactant activity of the acrylic is sufficient to carry the water insoluble resin into the aqueous dispersion. Non-heat reactive phenolics may also be used for their chemical resistance and plasticizing affect on the baked film.

Examples of phenolics which may be used are Union Carbide's BKR 2620, BK5918 and CK2400. Reichhold's Varcum 5476,8357 and 8345 are also useable.

Examples of acrylic/epoxy/phenolic "C" enamels are detailed in Examples 3, 7 and 9. An acrylic/epoxy "C" enamel is detailed in example 10.

The "C" enamel composition may be applied to metal, flat sheet stock used in the production of food containers by roller coat application. These compositions may also be useful in spray application to the interior of pre-beaded or post-beaded preformed metal containers. Beading is a process whereby profile rings are fabricated into the can to increase the strength of the can walls. If the container is post-beaded i.e., profile rings fabricated into sidewalls after the coating is applied and cured, the coating composition must be capable of providing sufficient lubricity to the metal surface to prevent damaging the baked film. For this reason, an integral part of the "C" enamel formulation for post-beaded cans is a wax lubrication. The coating is designed so that the lubricant will "bloom" to the surface of the cured film. During the process of fabricating the side-wall rings the surface lubricant provides the lubricity which prevents scratching or tearing of the film.

Coefficient of friction of the surface, or surface lubricity, may be measured by the use of an Altek, manufactured by Alteck of Torrington, CT, or by a Jon Wood Slip Angle Mobility Tester, Jon Wood Company, Kansas City, Mo.

"C" enamels may be spray applied to the interior of pre-beaded cans and baked. Film discontinuities or weak spots may be visualized by filling the coated can with a dilute solution of copper sulfate in dilute hydrochloric acid.

Chemical resistance of the coated can is measured by packing the container with a vegetable which gives severe under film staining, such as peas or corn. The packed container is first processed for 1 hour at 250° F. prior to storage for 30 days at 120° F.

Flexibility of flat sheet formulation is evaluated by applying the enamel to tinplate, by direct roller coater, at the correct film weight, and baking the enamel at the specified temperature for the specified time. A 307 mm diameter can end is punched out, and the end subjected to dilute copper sulfate solutin. The performance of the end is rated by visual inspection.

In like manner, chemical resistance is evaluated by stamping out 307 ends and using them as the top and bottoms of cans packed with aggressive foods, such as peas, corn or dogfood. Performance is rated by a visual inspection of the degree of staining caused by the packed food on the top and bottom ends, after 30 days at 120° F.

DESCRIPTION OF THE PREFERRED EMBODIMENTS

Illustrating the invention are the following examples, which, however, are not to be construed as limiting the invention to their details. All parts and percentages in the examples as well as throughout the specification are by weight unless otherwise indicated.

EXAMPLES

Example 1

Acrylic used in the manufacture of zinc oxide paste

A carboxyl functional acrylic resin of acid number 120 is prepared in butoxy ethanol. The resin, reduced to 50% non-volatiles, has a viscosity of 240 P. Molecular weight of the acrylic polymer is approximately 40,000 (Mw measured by GPS vs. polystyrene).

Example 2

Production of the zinc oxide paste

The acrylic resin of Example 1 is neutralized to approximately 70% of theoretical, and reduced with water to 40% nonvolatiles. Zinc oxide is added to a ball mill and milled solution for 24-48 hours. To allow easier handling, the ball milled paste is blended with additional acrylic from Example 1 which has been neutralized to 70% with dimethylaminoethanol, and reduced with water.

| PASTE | |
|---|---|
| ACRYLIC RESIN FROM 1 | 195.40 |
| DIMETHLAMINOETHANOL | 16.40 |
| WATER | 20.13 |
| ZINC OXIDE | 305.28 |
| BUTANOL | 8.07 |
| PASTE REDUCTION | |
| ACRYLIC RESIN FROM 1 | 333.29 |
| DIMETHYLAMINOETHANOL | 13.67 |
| WATER | 107.76 |
| | 1000.00 |
| SPECIFICATIONS | |
| PIGMENT/BINDER | 1/0.8 |
| BISCOSITY | 15,000 cps |

Example 3

Preparation of Aqueous Clear "C" Enamel

A solution of Epon 1009 in butanol and butoxuethanol is made at 60% non-volatiles. An acrylic resin with at least 30% carboxylic acid based on solids, and an acid number of 200 mg KOH/g and molecular weight (Mw) 40,000, is prepared at 55% non-volatiles in butanol and butoxyethanol. The epoxy solution and the acrylic solutions are blended, and the temperature of the solution raised to 80° C. The acrylic and epoxy resins are allowed to react for 1 hour. A 60% solution of a thermosetting phenolic, such as Union Caribde's CK2400 or Richhold's Varcum 8343, in butoxy ethanol is then added to the acrylic/epoxy solution and mixed for 1 hour to ensure homogeneity. Water is added to reduce the resin solution to about 40% solids. The paste in Example 2 is slowly added to the aqueous dispersion which is at 75° C. under agitation. The paste is mixed into the aqueous dispersion over 2 hours. Additional water, to reduce non-volatiles ot 23% and an aqueous lubrication is added.

| 1. BUTOXYETHANOL | 58.4 |
|---|---|
| BUTANOL | 25.0 |
| EPON 1009 | 96.7 |
| 2. ACRYLIC RESIN | 110.0 |
| DIMETHYLAMINOETHANOL | 6.8 |
| 3. PHENOLIC SOLUTION | 112.5 |
| 4. WATER | 416.4 |
| 5. PASTE | 32.0 |
| 6. LUBRICANT | 6.5 |
| 7. WATER | 135.0 |
| | 1000.0 |
| SPECIFICATIONS | |
| NON-VOLATILES | 23.5, 10' @ 400F |
| pH | 7.6 |
| VISCOSITY | 3,500 CS, BROOKFIELD, #3 SPINDLE |

After six months at room temperature the zinc oxide containing enamel was still homogeneous. Viscosity had risen from 55" in a Ford 4 cup to 75".

The following examples represent two acrylic variations using the same phenolic and epoxy solution. The acrylics are incorporated into single package "C" enamels in examples 7 and 9. The epoxy resin may be chosen from any of the commercially available "9" types, such as, Epon 1009 or DER 669.

Example 4

Epoxy Resin Solution

| Epon 1009 | 54.00 |
|---|---|
| Butoxyethanol | 29.00 |
| Butanol | 14.00 |
| | 100.00 |

Phenolics used to prepare the solution may be chosen from any of the commercially available thermoplastic or thermosetting resins provided by such suppliers as Union Carbide, Schnectady, Reichhold or Monsanto. Particularly useful, but not limited to them, are such phenolics as Reichhold's Varcum 6820, 5416 and 8345, and Union Carbide's CK 2400.

Example 5

Phenolic Solution

| PHENOLIC RESIN | 60.0 |
|---|---|
| BUTOXYETHANOL | 40.0 |

Example 6

Acrylic Resin Solution

An acrylic resin is prepared by the following method. Cosolvent selection will depend on the method used to apply the final product, spray or rollercoat.

One third of the monomer catalyst blend is added to the reaction solvent and heated to reflux. The remaining two thirds are added over two hours.

| REACTION SOLVENT | |
|---|---|
| Butanol | 27.78 |
| MONOMER/CATALYST MIX | |
| Styrene | 12.60 |
| Ethyl Acrylate | 20.85 |
| Methacrylic Acid | 16.34 |
| Benzoyl Peroxide | .39 |
| SOLVENT | |
| Butanol | 22.04 |
| | 100.00 |

The acrylic reaction mass is kept at reflux for one additinal hour after the mix is in. Final nonvolatiles of the solution is 50%.

Example 7

Single Package "C" Enamel

As 1 package "C" enamel is prepared from the following formulation.

| EPOXY RESIN SOLUTION (4) | 152.82 |
|---|---|
| ACRYLIC SOLUTION (6) | 111.54 |

-continued

| | |
|---|---|
| DIMETHYLAMINOETHANOL | 7.24 |

The two resin solutions are blended and heated to 65° C. The amine is added and the temperature raised to 70° C. and held for 1 hour. The phenolic solution is then added and allowed to mix with the above for 1 hour.

| | |
|---|---|
| PHENOLIC RESIN SOLUTION (5) | 109 |

The paste for Example 2 is then added and the temperature maintained between 65°–75° C.

| | |
|---|---|
| ZINC OXIDE PASTE | 30.5 |
| WATER | 586.32 |
| LUBRICANT | 7.66 |

This product produced a stable "C" enamel with a viscosity of 1200 cps and a nonvolatile content of 23%.

Example 8

Acrylic Resin Solution

A product similar to 7 may be prepared from an acrylic containing the following component.

| | |
|---|---|
| REACTION SOLVENT | |
| Butanol | 29.85 |
| MONOMER/CATALYST | |
| Butyl Acrylate | 9.85 |
| Acrylic Acid | 14.95 |
| Styrene | 27.36 |
| Benzoyl Peroxide | .49 |
| SOLVENT | |
| Butoxyethanol | 19.92 |
| | 100.00 |

Example 9

Single Package "C" Enamel

A one package enamel is prepared from the following components.

| | |
|---|---|
| EXPOXY SOLUTION (4) | 70.74 |
| ACRYLIC SOLUTION (8) | 99.03 |
| DIMETHYLAMINOETHANOL | 6.08 |

The above are mixed and heated at 75° C. for 3 hours. A phenolic solution is then added and held at 70° for 1 hour.

| | |
|---|---|
| PHENOLIC SOLUTION (5) | 82.05 |

The paste from Example 2 is added, and the mixture held at 75° C. for 1 hour.

| | |
|---|---|
| PASTE (2) | 25.46 |

After the hour hold, water and lubricant are then added.

| | |
|---|---|
| WATER | 707.45 |
| | 9.19 |
| | 1000.00 |

Nonvolatiles of the composition are 23%, and viscosity is 1000 cps. Examples 7 and 9 were evaluated for chemical resistance and fabrication, and stability and were rated as excellent when compared to a 2 package system.

The following examples illustrate the preparation of a single package "C" enamel based on an acrylic modified epoxy resin.

Example 10

Single Package "C" Enamel

| | |
|---|---|
| EPOXY RESIN SOLUTION (4) | 211.50 |
| ACRYLIC RESIN SOLUTION (6) | 154.70 |
| DIMETHYLAMINOETHANOL | 10.50 |

The resin solutions 4 and 6 are blended and heated at 75° C. for 3 hours in the presence of dimethylaminoethanol. Paste from Example 2 is then added.

| | |
|---|---|
| PASTE (2) | 25.80 | under agitation. When homogeneous, the blend is further reduced with water and aqueous lubricant.

| | |
|---|---|
| WATER | 585.80 |
| LUBRICANT | 12.50 |
| | 100.00 |

The total nonvolatiles are 23.2% and the viscosity is 1400 cps. The coating was evaluated for chemical resistance, flexibility, and stability, and were rated as good compared to a similar product containing no zinc oxide.

We claim:

1. An aqueous single package clear enamel comprising a dispersion of zinc oxide pigment dispersed in an epoxy/styrene-alkyl acrylate-methacrylic acid/phenol resin blend wherein the zinc oxide is reacted with the neutralized carboxyl groups of the resin blend and wherein the carboxyl containing polymer has an acid number of from about 200 to about 250.

2. The aqueous enamel of claim 1 wherein the enamel contains less than 1% zinc oxide pigment.

* * * * *